(12) United States Patent
Im et al.

(10) Patent No.: US 8,886,912 B2
(45) Date of Patent: *Nov. 11, 2014

(54) METHODS AND APPARATUS FOR REALLOCATING ADDRESSABLE SPACES WITHIN MEMORY DEVICES

(71) Applicant: Samsung Electronics Co., Suwon-si (KR)

(72) Inventors: Jung-Beem Im, Hwaseong-si (KR); Hye-Young Kim, Seoul (KR); Young-Joon Choi, Seongnam-si (KR); Dong-Gi Lee, Yongin-si (KR); Shea-Yun Lee, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/656,446

(22) Filed: Oct. 19, 2012

(65) Prior Publication Data

US 2013/0311709 A1      Nov. 21, 2013

Related U.S. Application Data

(63) Continuation of application No. 13/208,804, filed on Aug. 12, 2011, now Pat. No. 8,312,248, which is a continuation of application No. 11/565,811, filed on Dec. 1, 2006, now Pat. No. 8,001,356.

(30) Foreign Application Priority Data

Oct. 19, 2006   (KR) ......................... 10-2006-0101644

(51) Int. Cl.
*G06F 12/00*      (2006.01)

(52) U.S. Cl.
USPC ............ 711/173; 711/170; 711/202; 711/103

(58) Field of Classification Search
None
See application file for complete search history.

(56) References Cited

U.S. PATENT DOCUMENTS

| 5,117,350 A | 5/1992 | Parrish et al. |
| 6,901,498 B2 | 5/2005 | Conley |
| 2005/0246485 A1 | 11/2005 | Assaf et al. |
| 2006/0020943 A1 | 1/2006 | Boutcher et al. |
| 2007/0106860 A1 | 5/2007 | Foster et al. |

FOREIGN PATENT DOCUMENTS

| JP | 1998-0031611 | 2/1998 |
| JP | 2004-0079140 | 3/2004 |

OTHER PUBLICATIONS

Notice to Submit Response to an Office Action of the Chinese Patent Application No. 200710006117.0, Issued on Jan. 30, 2011.

*Primary Examiner* — Baboucarr Faal
(74) *Attorney, Agent, or Firm* — Muir Patent Consulting, PLLC

(57) ABSTRACT

Integrated circuit systems include a non-volatile memory device (e.g., flash EEPROM device) and a memory processing circuit. The memory processing circuit is electrically coupled to the non-volatile memory device. The memory processing circuit is configured to reallocate addressable space within the non-volatile memory device. This reallocation is performed by increasing a number of physical addresses within the non-volatile memory device that are reserved as redundant memory addresses, in response to a capacity adjust command received by the memory processing circuit.

16 Claims, 2 Drawing Sheets

METHODS AND APPARATUS FOR REALLOCATING ADDRESSABLE SPACES WITHIN MEMORY DEVICES

CROSS-REFERENCE TO RELATED APPLICATION

This application is a continuation of U.S. patent application Ser. No. 13/208,804 filed on Aug. 12, 2011, now allowed on Jun. 25, 2012, which is a continuation of and claims priority to U.S. patent application Ser. No. 11/565,811 filed Dec. 1,2006, now U.S. Pat. No. 8,001,356, which claims priority to Korean Patent Application No. 10-2006-0101644, filed on Oct. 19, 2006, the disclosure of each of which is hereby incorporated herein by reference in their entirety.

FIELD OF THE INVENTION

The present invention relates to integrated circuit systems and, more particularly, to processors for controlling memory devices and methods of operating memory devices.

BACKGROUND OF THE INVENTION

Non-volatile memory devices, such as flash EEPROM devices, have many advantageous characteristics that make them suitable for use in low-power applications. These low-power applications include mobile device applications, such as digital cameras, MP3 music players, cellular telephones, memory cards and personal digital assistants (PDA).

As will be understood by those skilled in the art, operations to program flash EEPROM devices are typically automatically preceded by erase operations (e.g., block erasure) which prepare EEPROM cells within the devices to accept new program data. Thus, it is not uncommon for an operation to program a block of cells within an EEPROM devices to be preceded by an operation to erase the block of cells to achieve a "reset" threshold voltage condition within the cells. Unfortunately, performing a relatively large number of erase operations on a block of EEPROM cells may result in the generation of "threshold-voltage" defects within one or more EEPROM cells and thereby reduce an effective lifetime of an EEPROM device.

To address an increase in the number of EEPROM cell defects that may occur in response to increase in the number of "block" erase operations performed on the EEPROM device, many EEPROM devices are configured to have one or more reserved memory blocks of EEPROM cells that operate as "redundant" memory blocks for other active memory blocks of EEPROM cells, which undergo multiple write, read and erase operations during normal use. Each of a plurality of active memory blocks that become defective during use of the EEPROM device may be replaced by a respective reserved memory block. However, once all available reserved memory blocks have been utilized to replace respective active memory blocks, then the detection of any further defects within the EEPROM device during subsequent erase and programming operations may result in device failure.

To reduce the likelihood of EEPROM device failure caused by an excessive number of erase/program operations being performed on one or more active memory blocks, techniques have been developed to relatively evenly distribute erase/program operations across all of the active memory blocks. These techniques may use flash translation layer (FTL) technology to support the relatively even distribution of erase/program operations. Nonetheless, because many of the active memory blocks may have different susceptibilities to defects caused by erase/program operations, the techniques to relatively evenly distribute erase/program operations across multiple active memory blocks may not be entirely successful in achieving relatively long device lifetimes.

SUMMARY OF THE INVENTION

Embodiments of the present invention include integrated circuit systems having non-volatile memory devices and memory processing circuits therein. A typical non-volatile memory devices include flash EEPROM devices. The memory processing circuit is electrically coupled to the non-volatile memory device. The memory processing circuit is configured to reallocate addressable space within the non-volatile memory device. This reallocation is performed by increasing a number of physical addresses within the non-volatile memory device that are reserved as redundant memory addresses, in response to a capacity adjust command received by the memory processing circuit.

According to some of these embodiments, the memory processing circuit includes an address transformation table. The address transformation table is configured to generate physical addresses that map to the non-volatile memory device in response to logical addresses received by the memory processing circuit. The memory processing circuit is further configured to read a memory allocation region within the non-volatile memory device to determine a capacity of an active memory region and/or a reserved memory region within the non-volatile memory device. This read operation is also performed in response to a capacity adjust command received by the memory processing circuit. In addition, the memory processing circuit is configured to write data into the memory allocation region within the non-volatile memory device, in response to the capacity adjust command. In this manner, the memory processing circuit may perform operations to read the memory allocation region to determine a first allocation between active memory blocks and reserved memory blocks within the non-volatile memory device and then write the memory allocation region with a modified allocation between active memory blocks and reserved memory blocks within the non-volatile memory device.

According to still further embodiments of the invention, the integrated circuit system is configured with a non-volatile memory device having at least an active memory region and a reserved memory region therein and a memory processing circuit. The memory processing circuit is configured to adjust capacities of the active and reserved memory regions in response to a capacity adjust command received by the memory processing circuit. The memory processing circuit is configured to read a memory allocation region within the integrated circuit system to determine capacities of the active and reserved memory regions, in advance of adjusting capacities of the active and reserved memory regions. This memory processing circuit may include an address transformation table that is configured to generate physical addresses in response to logical addresses received by the memory processing circuit. These physical addresses map to the non-volatile memory device. The memory processing circuit further includes an address transformation table. This table is configured to generate physical addresses that map to the non-volatile memory device.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
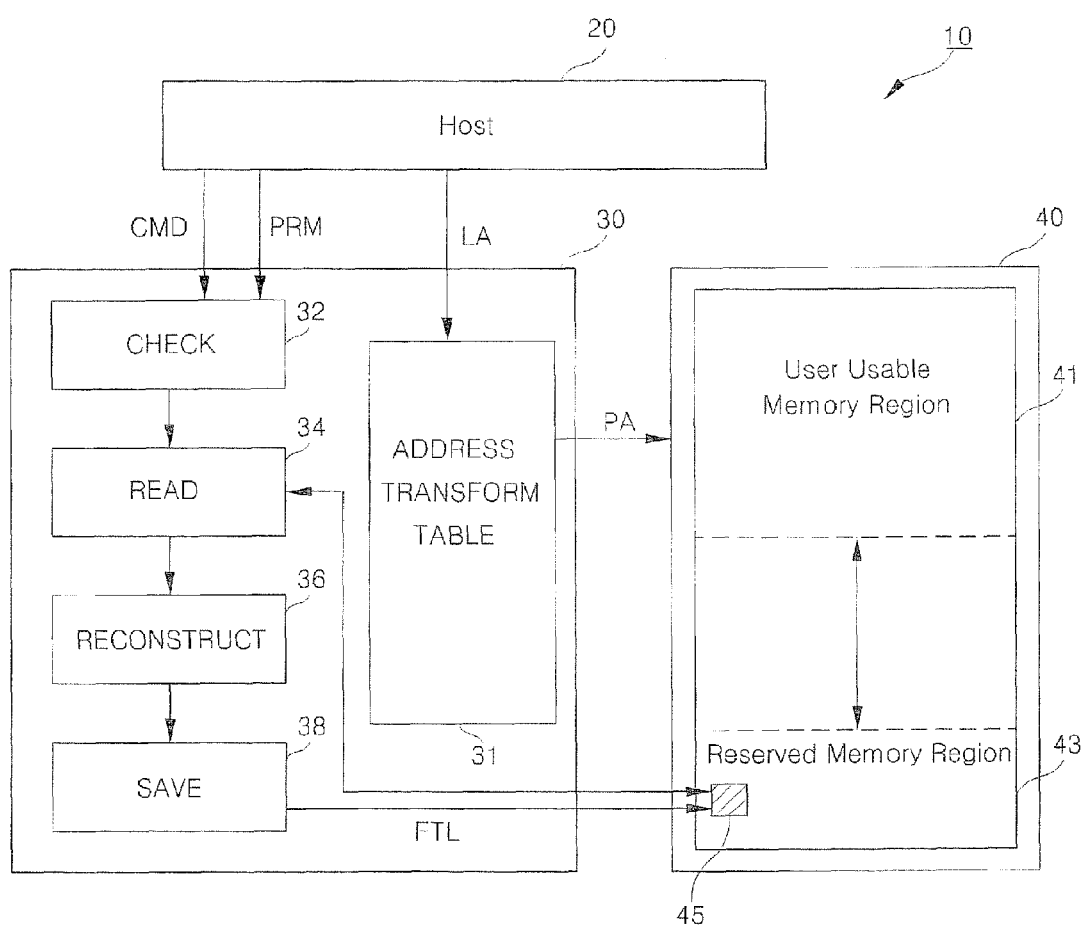
FIG. 1 is a block diagram of an integrated circuit system according to an embodiment of the present invention.

FIG. 1 illustrates an integrated circuit system 10 according to an embodiment of the present invention. This system 10 is illustrated as including a host processor 20, a memory processor 30 and a non-volatile memory device 40, connected as illustrated. The memory processor 30 and the non-volatile memory device 40 may be treated herein as a memory capacity adjusting device. This system 10 may be embodied within a video camera, television, audio system, game console, mobile phone, personal computer, personal digital assistant, voice recorder, memory card, solid state disk drive, or other device that may utilize non-volatile memory.

The host processor 20 within the system 10 may include a file system or file system components and the memory processor 30 may include components that operate as a Flash Translation Layer (FTL) and an address transformation table 31. This address transformation table 31 may be configured as a volatile memory device (e.g., SRAM device) in some embodiments of the invention. As will be understood by those skilled in the art, the FTL may be configured to perform background erase operations on the memory device 40, which may be implemented as a flash EEPROM device. Moreover, the FTL may be configured to translate logical addresses (LA) generated by the host processor 20 into physical addresses (PA) associated with the non-volatile memory device 40, during memory write operations. As illustrated by Blocks 32, 34, 36 and 38, the memory processor 30 may be further configured to perform checking, read, reconstruction and saving operations, as described more fully hereinbelow.

The memory device 40 is illustrated as including at least two memory partitions. These partitions include an active memory region 41, also referred to as a user usable memory region, and a reserved memory region 43. The memory capacity of the active memory region 41 will be referred to herein as the active memory capacity, which reflects the user usable memory capacity, and the memory capacity of the reserved memory region 43 will be referred to herein as the reserved memory capacity.

As will now be described, the active memory capacity and the reserved memory capacity may be adjusted by changing the memory mapping operations performed by the memory processor 30. For example, during manufacture, the memory device 40 may be configured to have a total memory capacity of 16-gigabytes (GB). From this total memory capacity, an initial partitioning of 15 GB may be allocated to the active memory region 41 and an initial partitioning of 1 GB may be allocated to the reserved memory region 43. This 15:1 partitioning ratio between the active memory region 41 and the reserved memory region 43 may be identified by information stored within a memory allocation region 45. This memory allocation 45 may be located within the reserved memory region 43, as illustrated, or may be located within a memory device (not shown) within the memory processor 30.

The initial partitioning specified at the time of manufacture may be adjusted for a given user application. In particular, user applications that involve a relatively high frequency of write (and pre-write erase) operations may benefit from a different partitioning ratio that reduces the size of the active memory region 41 relative to the reserved memory region 43. For example, if an operating system (OS) is installed in the memory device 40, then the partitioning ratio may be changed from 15:1, as set at the time of manufacture, to a lower ratio of 14:2 or lower. This lower ratio results in a greater allocation of memory to the reserved memory region 43 for those cases where there is a higher likelihood that memory defects may develop over time in the active memory region 41 when a relatively high frequency of write operations (and corresponding pre-write erase operations) occur. To achieve this change in the partitioning ratio, a capacity adjusting instruction may be issued by the host processor 20 to the memory processor 30. A sequence of operations for performing the capacity adjusting instruction may be performed by the memory processor 30 and, in particular, may be performed using logic associated with the FTL.

In advance of generating a capacity adjusting instruction, the host processor 20 may issue a capacity checking instruction (or command) to the memory processor 30. In response to this instruction, the memory processor 30 may read information that indicates the partitioning ratio from the memory allocation region 45. This information read from the memory allocation region 45 may specify the capacity of the reserved memory region 43, a ratio of the capacity of the memory device 40 relative to the reserved memory region 43, or a ratio of the active memory region 41 relative to the reserved memory region 43, for example. Based on this information read from the memory allocation region 45, the memory processor 30 may determine a quantity of the reserved memory region 43 and/or a quantity of the active memory region 41. These quantities may then be communicated to the host processor 20.

In response to the capacity checking instruction, the host processor 20 may issue a capacity adjusting instruction (or command CMD) along with a parameter, which can identify a modified partitioning between the reserved memory region 43 and the active memory region 41. In particular, this parameter may specify a size of the active memory region 41, a size of the reserved memory region 43 or a ratio of the active memory region 41 to the reserved memory region 43, for example. This parameter, which may be specified by a user, may be determined from information received at an interface of the host processor 20. In some embodiments of the invention, the parameter may be specified as a reserved memory parameter (PRM), which specifies a size of the reserved memory region 43. Thus, if the user requests an increase in the reserved memory capacity to 2 GB, the host processor 20 may output a parameter PRM that specifies the 2 GB value, to the memory processor 30.

Figure 2:
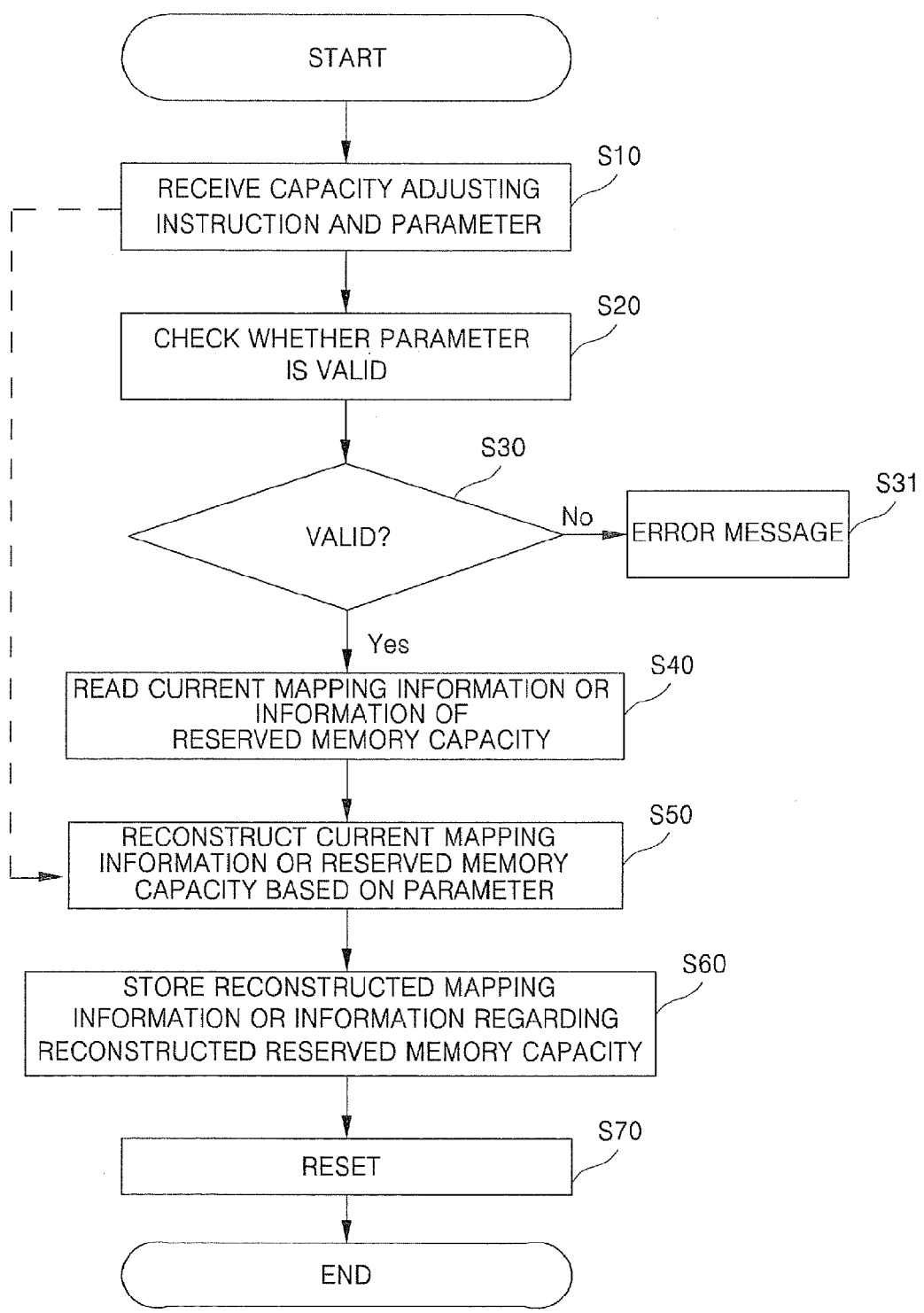
FIG. 2 is a flow diagram that illustrates operations performed by the system of FIG. 1 in response to a capacity adjusting instruction.

As illustrated by the flow diagram of FIG. 2, this receipt of the capacity adjusting instruction and parameter (PRM) by the memory processor 30, Block S10, may result in the performance of a check operation (optional), Blocks S20-S30, to determine whether the parameter PRM is valid. This check operation may be performed by a check logic circuit 32 within the memory processor 30. In the event the parameter PRM is not valid, which means it may have an incorrect format or may be outside a predetermined range, the memory processor 30 may output an error message, Block S31. However, if the parameter PRM is valid, then the memory processor 30 may perform an operation (optional) to read the memory allocation region 45, Block S40. This read operation may be performed by a read logic circuit 34 within the memory processor 30.

A reconstruct logic circuit 36 within the memory processor 30 may then be used to reconstruct the mapping information (e.g., memory map) to accord with the new parameter PRM, Block S50. Based on this reconstruction, a new size of the active memory region 41 (e.g., 14 GB) and the reserved memory region 43 (e.g, 2 GB) may be established and a modified address transformation table 31 may be constructed to correspond to this new allocation ratio. A save logic circuit 38 may then be activated to store a new partitioning (e.g., partitioning ratio) value within the memory allocation region 45, Block S60. A reset operation, Block S70, may then be performed to enable the memory device 40 to be repopulated with new entries that are placed in locations identified by the modified address transformation table 31. These operations identified by FIG. 2 may be performed using exclusively hardware or combinations of hardware and software within the memory processor 30 and/or host processor 20. In some embodiments of the invention, the software may be embodied as a computer-readable program of instructions embodied on a computer-readable medium.

These operations for increasing the capacity of the reserved memory region 43 may also incur in response to detecting an exhaustion of space within the reserved memory region 43 during operation of the memory device 40. For example, in the event the memory processor 30 detects an exhaustion of free space within the reserved memory region 43, which may result from an accumulation of defects within the active memory region 41 during normal use, the memory processor 30 may initiate an increase in the capacity of the reserved memory region 43. Such an increase in the capacity of the reserved memory region 43 may occur multiple times in order to extend the lifetime of the memory device 40.

Alternatively, if the user requests a decrease in the reserved memory capacity to 0.1 GB, the host processor 20 may output a parameter PRM that specifies the 0.1 GB value, to the memory processor 30. This smaller 0.1 GB value may be appropriate for those applications wherein the memory device 40 is not undergoing a high frequency of erase/write operations during normal operation. Such an application may occur when the memory device 40 is being used for data backup purposes, when write operations are seldom. Under these conditions, the active memory region 41 may be allocated to have a capacity of 15.9 GB. The operations described above with respect to FIG. 2 may then be repeated for the case where the PRM designates a 0.1 GM value for the reserved memory region 43.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of adjusting a memory system including a memory processor and a nonvolatile memory device comprising an active memory and a reserved memory, the memory system being connected to a host, the method comprising:
   detecting an amount of free space of the reserved memory during an operation of the memory system;
   sending a result of the detecting to the host;
   receiving a parameter value along with a capacity adjusting command from the host;
   storing parameter information in the nonvolatile memory device in response to the received parameter value;
   reading a current mapping information from the nonvolatile memory device;
   constructing a new mapping information by modifying the current mapping information in response to the capacity adjusting command; and
   saving the new mapping information into the nonvolatile memory device,
   wherein the parameter value establishes a new partitioning ratio of the active memory to the reserved memory, and
   wherein constructing the new mapping information causes a user usable capacity of the nonvolatile memory device, as viewed by the host, to be adjusted.

2. The method of claim 1, wherein the constructing the new mapping information is performed to increase a capacity of the reserved memory4n in response to the capacity adjusting command.

3. The method of claim 1, wherein the constructing the new mapping information is performed to decrease a capacity of the reserved memory in response to the capacity adjusting command.

4. The method of claim 1, wherein the nonvolatile memory device is a memory card.

5. The method of claim 1, wherein the method is performed using logic associated with a flash translation layer.

6. A non-transitory computer readable storage medium having a computer readable program stored therein, wherein the computer readable program, when executed on a memory system including a memory processor and a nonvolatile memory device comprising an active memory and a reserved memory, causes the memory system to:
   detect an amount of free space of the reserved memory during an operation of the system;
   send a result of the detecting to a host connected to the memory system;
   upon receiving a parameter value along with a capacity adjusting command from the host, storing parameter information in the nonvolatile memory device in response to the received parameter value;
   read a current mapping information from the nonvolatile memory device;
   construct new mapping information by modifying the current mapping information in response to the capacity adjusting command; and
   save the new mapping information into the non volatile memory device, wherein the parameter value establishes a new partitioning ratio of the active memory to the reserved memory, and
   wherein constructing the new mapping information causes a user usable capacity of the nonvolatile memory device, as viewed by the host to be adjusted.

7. A memory system, comprising:
   a memory processor; and
   a nonvolatile memory device including an active memory and a reserved memory,
   wherein the memory processor is configured to detect amount of free space of the reserved memory during an operation of the memory system, to send a result of the detecting to a host connected to the memory system, to receive a parameter value along with a capacity adjusting command from the host, to store parameter information in the nonvolatile memory device in response to the received parameter value, to read a current mapping information from the nonvolatile memory device, to construct new mapping information by modifying the current mapping information in response to the capacity adjusting command, and to save the new mapping information into the nonvolatile memory device,
wherein the parameter value establishes a new partitioning ratio of the active memory to the reserved memory, and
wherein constructing the new mapping information causes a user usable capacity of the nonvolatile memory device, as viewed by the host, to be adjusted.

8. The memory system of claim 7, wherein the nonvolatile memory device is a memory card.

9. A method of adjusting of a memory system including a memory processor and a nonvolatile memory device comprising an active memory and a reserved memory, the method comprising:
receiving a parameter value along with a capacity adjusting instruction from a host to adjust an active memory capacity of the active memory, the parameter value identifying a size of the active memory capacity;
storing parameter information in the nonvolatile memory device in response to the received parameter value;
reading a current mapping information from the nonvolatile memory device;
constructing new mapping information by modifying the current mapping information based on the parameter value; and
saving the new mapping information into the nonvolatile memory device,
wherein the parameter value establishes a new partitioning ratio of the active memory to the reserved memory, and
wherein constructing the new mapping information causes a user usable capacity of the nonvolatile memory device, as viewed by the host, to be adjusted.

10. The method of claim 9, wherein the constructing the new mapping information is performed to increase a capacity of the reserved memory in response to the capacity adjusting command.

11. The method of claim 9, wherein the constructing the new mapping information is performed to decrease a capacity of the reserved memory in response to the capacity adjusting command.

12. The method of claim 9, wherein the nonvolatile memory device is a flash EEPROM device.

13. The method of claim 9, wherein the method is performed using logic associated with a flash translation layer (FTL).

14. A non-transitory computer readable storage medium having a computer readable program stored therein, wherein the computer readable program, when executed on a memory system including a memory processor and a nonvolatile memory device comprising an active memory and a reserved memory, causes the memory system to:
upon receiving a parameter value along with a capacity adjusting instruction from a host to adjust an active memory capacity of the active memory, the parameter value identifying a size of the active memory capacity:
read a current mapping information from the nonvolatile memory device;
store parameter information in the nonvolatile memory device in response to the received parameter valu;
construct new mapping information by modifying the current mapping information based on the parameter value; and
save the new mapping information into the nonvolatile memory device,
wherein the parameter value establishes a new partitioning ratio of the active memory to the reserved memory,
wherein constructing the new mapping information causes a user usable capacity of the nonvolatile memory device, as viewed by the host, to be adjusted.

15. A memory system, comprising:
a memory processor; and
a nonvolatile memory device comprising an active memory and a reserved memory,
wherein the memory processor is configured to receive a parameter value along with a capacity adjusting instruction from a host to adjust an active memory capacity of the active memory, the parameter value identifying a size of the active memory capacity, to store parameter information in the nonvolatile memory device in response to the received parameter value, to read a current mapping information from the nonvolatile memory device, to construct new mapping information by modifying the current mapping information based on the parameter value, and to save the new mapping information into the nonvolatile memory device, wherein the parameter value establishes a new partitioning ratio of the active memory to the reserved memory,
wherein constructing the new mapping information causes a user usable capacity of the nonvolatile memory device, as viewed by the host, to be adjusted.

16. The memory system of claim 15, wherein the nonvolatile memory device is a flash EEPROM device.

* * * * *